United States Patent
Venkateshappa

(10) Patent No.: US 11,830,348 B2
(45) Date of Patent: Nov. 28, 2023

(54) METHOD AND SYSTEM TO DETERMINE A FALSE ALARM BASED ON AN ANALYSIS OF VIDEO/S

(71) Applicant: Carrier Corporation, Palm Beach Gardens, FL (US)

(72) Inventor: Nagarjuna Venkateshappa, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/255,773

(22) PCT Filed: Aug. 24, 2020

(86) PCT No.: PCT/IB2020/057900
§ 371 (c)(1),
(2) Date: Dec. 23, 2020

(87) PCT Pub. No.: WO2021/048667
PCT Pub. Date: Mar. 18, 2021

(65) Prior Publication Data
US 2022/0309908 A1  Sep. 29, 2022

(30) Foreign Application Priority Data
Sep. 12, 2019  (IN) .............................. 201911036641

(51) Int. Cl.
*G08B 29/18* (2006.01)
*G06V 20/52* (2022.01)
(Continued)

(52) U.S. Cl.
CPC .......... *G08B 29/185* (2013.01); *G06V 10/82* (2022.01); *G06V 20/41* (2022.01); *G06V 20/52* (2022.01);
(Continued)

(58) Field of Classification Search
CPC .. G08B 29/185; G08B 17/125; G08B 29/186; G06V 20/52; G06V 10/82; G06V 20/41
(Continued)

(56) References Cited

U.S. PATENT DOCUMENTS

2003/0214583 A1* 11/2003 Sadok .................. G08B 17/125
                                                              348/143
2016/0300465 A1* 10/2016 Britton ............. G08B 13/19697
(Continued)

FOREIGN PATENT DOCUMENTS

| CN | 207164951 U | 3/2018 |
| CN | 109543631 A | 3/2019 |

OTHER PUBLICATIONS

International Search Report and Written Opinion for Application No. PCT/IB2020/057900; dated Jan. 12, 2020; 10 Pages.

*Primary Examiner* — Kerri L McNally
(74) *Attorney, Agent, or Firm* — CANTOR COLBURN LLP

(57) ABSTRACT

Aspects of the invention are directed towards a system and a method for determining a false alarm based on analysis of video/s. One or more embodiments of the invention describe the method comprising steps of receiving one or more pre-recorded videos, the one or more pre-recorded videos indicating a false alarm activation. One or more embodiments of the invention further describe steps of analyzing false alarm activation in the one or more pre-recorded videos and receiving a real-time video captured from a camera. Accordingly, the false alarm is determined in the real-time video based on the analysis of the false alarm activation in the one or more pre-recorded videos.

16 Claims, 3 Drawing Sheets

(51) Int. Cl.
 *G06V 10/82* (2022.01)
 *G08B 17/12* (2006.01)
 *G06V 20/40* (2022.01)

(52) U.S. Cl.
 CPC ......... *G08B 17/125* (2013.01); *G08B 29/186* (2013.01)

(58) Field of Classification Search
 USPC ........................................................ 340/506
 See application file for complete search history.

(56) References Cited

U.S. PATENT DOCUMENTS

2017/0193810 A1\* 7/2017 Cao ........................ G06V 20/52
2018/0308475 A1 10/2018 Locke et al.
2019/0122534 A1 4/2019 McNutt et al.

\* cited by examiner

METHOD AND SYSTEM TO DETERMINE A FALSE ALARM BASED ON AN ANALYSIS OF VIDEO/S

CROSS-REFERENCE TO RELATED APPLICATIONS

This application is a 371 U.S. National Stage application of PCT/IB2020/057900, filed Aug. 24, 2020, which claims the benefit of Indian Provisional Application No. 201911036641, filed Sep. 12, 2019, both of which are incorporated by reference in their entirety herein.

TECHNICAL FIELD OF INVENTION

The present invention generally relates to alarm systems. More particularly, the invention relates to a system and a method for determining a false alarm based on analysis of video/s.

BACKGROUND OF THE INVENTION

In any adverse situation, people's safety becomes a prime and an important concern. Several measures are taken in order to ensure the safety of the people in an adverse situation. One such measure is the usage of an alarm system. In particular, an alarm gets activated and starts ringing when an alarm system either automatically detects an adverse situation or when a person manually activates the alarm. This activation of the alarm timely informs people that an adverse situation has arisen and after hearing the alarm, people leave or vacate a place. Such a measure is very useful for providing safety to people in an adverse situation.

However, such an alarm may not always be a true or an actual alarm as sometimes, the alarm may be falsely or maliciously activated by any person. As a result, people leave or vacate a place after an alarm is falsely or maliciously activated by the person. This false alarm activation may create panic and disturbance in the place and people may also get panicked. Also, when people come to know that the alarm was falsely or maliciously activated by a person, this leads to frustration, loss of precious time and loss of trust in the alarm system. Further, if the alarm gets falsely or maliciously activated by a person frequently, then people would not trust the alarm even on an occurrence of an adverse situation.

In view of the afore-mentioned problems in the existing solutions, there is a need of an efficient and effective system and a method for determining a false alarm. There is also a need for determining a false alarm that has been falsely or maliciously activated by a person. There is also a requirement for determining a false alarm to avoid causing disturbance to people. In order to solve the problems in the existing solutions, a system and a method are disclosed.

SUMMARY OF THE INVENTION

Various embodiments of the invention describe a method for determining a false alarm based on an analysis of a false alarm activation in one or more pre-recorded videos. The method comprises steps of receiving one or more pre-recorded videos, the one or more pre-recorded videos indicating a false alarm activation. The method further comprises steps of analyzing the false alarm activation in the one or more pre-recorded videos and receiving a real-time video captured from a camera. Accordingly, a false alarm is determined in the real-time video based on the analysis of the false alarm activation in the one or more pre-recorded videos.

In another embodiment of the invention, the false alarm in the real-time video is determined by comparing the real-time video with the one or more pre-recorded videos.

In an embodiment of the invention, the one or more pre-recorded videos indicating false alarm activation are filtered and designated by a server.

In another embodiment of the invention, the filtering and designation of the pre-recorded videos is enabled at a user terminal.

In yet another embodiment of the invention, an alert is generated when the false alarm is determined in the real-time video.

In still another embodiment of the invention, an indication is provided to a facility when the false alarm is not determined in the real-time video.

In a different embodiment of the invention, the false alarm activation in the one or more pre-recorded videos or the false alarm in the real-time video depicts a false activation of an alarm by a user.

In another embodiment of the invention, the alarm comprises a fire alarm, a smoke alarm, or a heat alarm.

In yet another embodiment of the invention, the alarm is activated when the user touches, pulls, presses or triggers an alarm unit.

In another embodiment of the invention, the camera and the alarm unit are installed proximate to each other.

In a different embodiment of the invention, a system is disclosed for determining a false alarm based on an analysis of a false alarm activation in one or more pre-recorded videos. The system comprises a receiver adapted to receive one or more pre-recorded videos, the one or more pre-recorded videos indicating a false alarm activation. The system further comprises an analysis unit adapted to analyze the false alarm activation in the one or more pre-recorded videos and the receiver adapted to receive a real-time video captured from a camera. The system also comprises a determination unit adapted to determine a false alarm in the real-time video based on the analysis of the false alarm activation in the one or more pre-recorded videos.

In another embodiment of the invention, the false alarm in the real-time video is determined by comparing the real-time video with the one or more pre-recorded videos.

In an embodiment of the invention, the one or more pre-recorded videos indicating false alarm activation are filtered and designated by a server.

In yet another embodiment of the invention, the determination unit is further adapted to generate an alert when the false alarm is determined in the real-time video.

In still another embodiment of the invention, the determination unit is further adapted to provide an indication to a facility when the false alarm is not determined in the real-time video.

In a different embodiment of the invention, the false alarm activation in the one or more pre-recorded videos or the false alarm in the real-time video depicts a false activation of an alarm by a user.

In another embodiment of the invention, the alarm comprises a fire alarm, a smoke alarm, or a heat alarm.

In yet another embodiment of the invention, the alarm is activated when the user touches, pulls, presses or triggers an alarm unit.

In another embodiment of the invention, the camera and the alarm unit are installed proximate to each other.

In another different embodiment of the invention, a computer readable medium is disclosed for determining a false alarm based on an analysis of a false alarm activation in one or more pre-recorded videos. The computer readable medium comprising one or more processors and a memory coupled to the one or more processors, the memory storing instructions which are executed by the one or more processors. The memory storing instructions executed by the one or more processors are configured to receive one or more pre-recorded videos, the one or more pre-recorded videos indicating a false alarm activation. The memory storing instructions which are executed by the one or more processors are further configured to analyze the false alarm activation in the one or more pre-recorded videos and receive a real-time video captured from a camera. The memory storing instructions which are executed by the one or more processors are further configured to determine a false alarm in the real-time video based on the analysis of the false alarm activation in the pre-recorded one or more videos.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
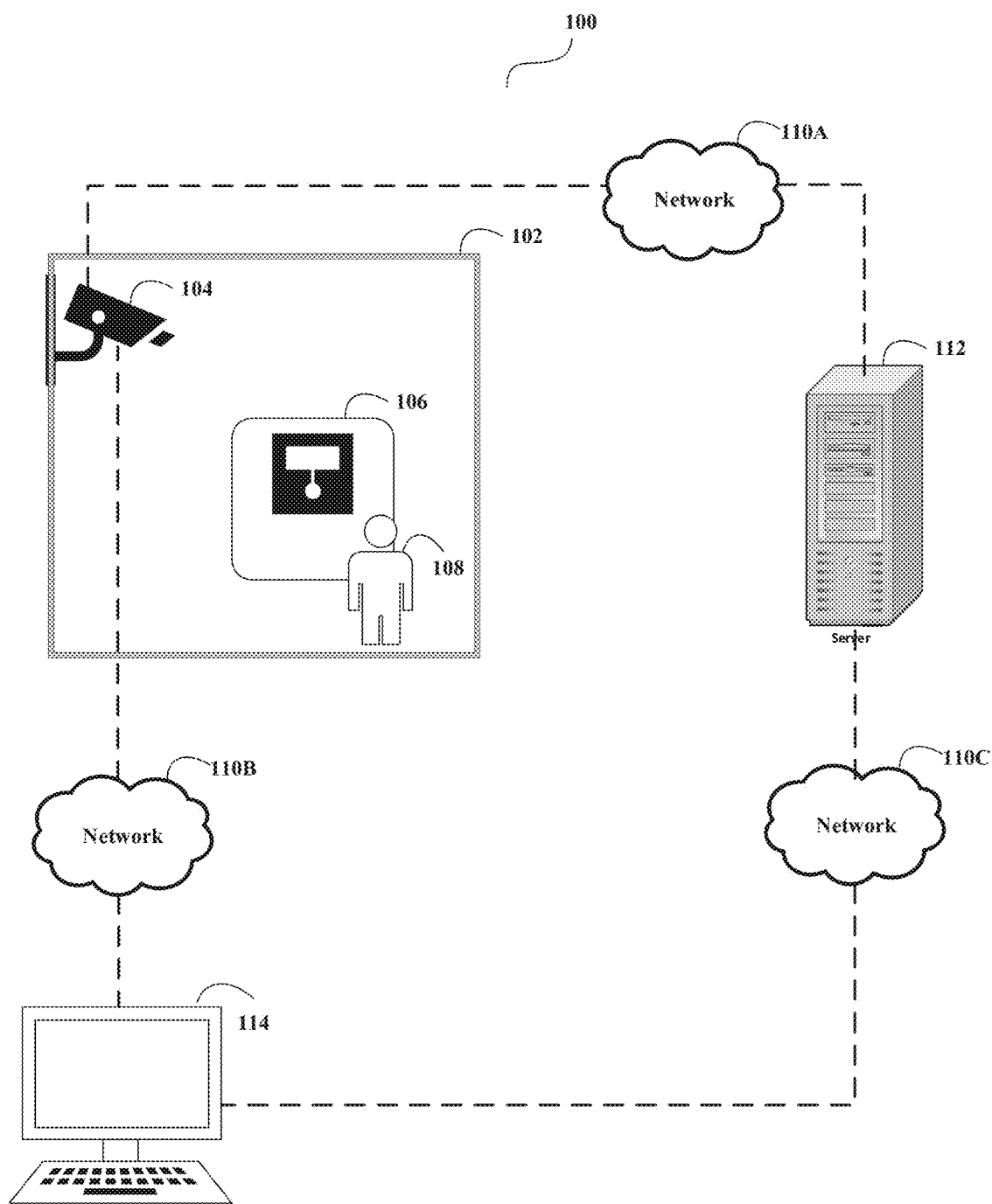
FIG. 1 depicts an exemplary system architecture according to an exemplary embodiment of the invention.

Described herein is the technology with a system and a method for determining a false alarm based on an analysis of a false alarm activation in one or more pre-recorded videos. Further, the false alarm is determined in a real-time video captured from a camera.

As used herein, the false alarm may be an alarm which may be falsely, accidentally or maliciously activated by a user. The user may activate the alarm falsely, accidentally or maliciously by touching, pulling, pressing or triggering an alarm unit. Also, the alarm may be a fire alarm, a smoke alarm, a heat alarm or any such alarm that is well known in the art.

As used herein, the alarm unit may be installed in a premises. The alarm unit may activate the alarm when the user touches, pulls, presses or triggers the alarm unit. The user may touch, pull, press or trigger the alarm unit in an adverse situation or falsely, accidentally or maliciously. Also, the alarm unit may be a manual call point, a fire alarm unit, a smoke alarm unit, a heat alarm unit or any such alarm unit that is well known in the art.

As used herein, the one or more pre-recorded videos may be one or more videos which may be previously recorded by a camera and stored in the camera or a server. The one or more pre-recorded videos may indicate a false alarm activation. Further, the false alarm activation may depict a false activation of an alarm by a user. The false alarm activation are analyzed by the camera, the server or a user terminal to learn and understand about the activation of the false alarm by the user.

As used herein, the camera may also be installed in a premises and may be placed proximate to the alarm unit. The camera may also capture a video in a real-time. The camera may be a closed-circuit television (CCTV) camera, a digital camera, a phone camera, an internet protocol camera, a stereo camera or any such camera that is well known in the art.

As used herein, the premises may be any building where the camera and the alarm unit may be installed. The premises may be an office, a hotel, a school, a college, a university, a home, or any such building well known in the art.

As used herein, the server has processing capabilities as disclosed further in the specification. The server may be a cloud storage, a remote database, or any such storage known in the art. The server may be located inside a premises with the alarm system or may be located remotely.

As used herein, the user terminal may be associated with a facility in the premises. The user terminal may be a desktop computer or a hand held device such as a mobile phone with network connectivity. Example of the user terminal includes a desktop, workstation PC, a laptop, a smart phone, a tablet, a wearable device and the like.

The present invention encompasses prerequisite/s to perform the invention according to an exemplary embodiment of the invention. One or more videos may be captured by one or more cameras and these captured videos may be stored by the camera in a memory of the camera. Alternatively, the captured videos may be transmitted by the camera to a server or to a user terminal and the server or the user terminal may then store the one or more videos. Therefore, these one or more stored videos may be called as one or more pre-recorded videos. Also, the one or more pre-recorded videos may indicate a false alarm activation. Specifically, the false alarm activation in the one or more pre-recorded videos depicts a false activation of an alarm by a user. Further, the alarm is activated when the user touches, pulls or triggers an alarm unit falsely, accidentally or maliciously.

In order to determine if the one or more pre-recorded videos indicate the false alarm activation, a camera may examine each of the one or more pre-recorded videos. In an alternative embodiment, the camera may transmit the one or more pre-recorded videos to a server through a network, where the server may examine the one or more pre-recorded videos to determine the false alarm activation in the one or more pre-recorded videos. In another different embodiment, the camera may transmit the one or more pre-recorded videos to a user terminal through a network, where the user terminal may examine the one or more pre-recorded videos to determine the false alarm activation in the one or more pre-recorded videos. The camera, the server or the user terminal may receive the one or more pre-recorded videos and then may filter the one or more pre-recorded videos. Such filtering of the one or more pre-recorded videos may be done based on the false alarm activation indicated in the one or more pre-recorded videos. In particular, if the one or more pre-recorded videos indicate the false alarm activation, then such a video may be designated/marked by the camera, the server or the user terminal. And, if the one or more pre-recorded videos do not indicate the false alarm activation then the camera, the server or the user terminal may discard such a video.

After designating/marking the one or more pre-recorded videos, the camera, the server or the user terminal may analyze the designated/marked pre-recorded videos indicating the false alarm activation. Such an analysis of each of the designated/marked pre-recorded videos may be performed to learn and understand how the false alarm is activated by the user. For an instance, the false alarm activation in the designated/marked pre-recorded videos may depict that an employee involved in a deep conversation over a mobile phone may accidentally pull the alarm unit or kids touch the alarm unit while playing. Also, the alarm unit may be accidentally triggered/pressed while carrying a ladder or any other load using trolleys etc. Such activities activate the false alarm and these false, accidental or malicious activities may be analyzed by the camera, the server or the user terminal. In specific, the camera, the server or the user terminal may identify activities in the designated/marked pre-recorded videos based on the analysis of the designated/marked pre-recorded videos. The camera, the server or the user terminal may also learn the reason/s or causes for activation of these false, accidental or malicious activities in the designated/marked pre-recorded videos. For an example, the camera, the server or the user terminal may identify and analyze the activity of a kid playing near the alarm unit or any person standing near to the alarm unit. The camera, the server or the user terminal may identify and analyze the presence of movable objects (such as a ladder or a pulley) near the alarm unit. Moreover, the movements of the person standing or walking near the alarm unit and movements of the objects are also analyzed by the camera, the server or the user terminal. Such an analysis of the false, accidental or malicious activities in the one or more pre-recorded videos may help in detecting and understanding how a false alarm has been activated by a user in the designated/marked pre-recorded videos. The camera, the server or the user terminal may also use the analyzed activities to train a system which can identify in future whether there is any indication of false alarm in a video.

The present invention may employ several techniques such as artificial intelligence technique, machine learning technique or deep learning technique to analyze each of the designated/marked pre-recorded videos. Also, these techniques may learn and understand how the false alarm is activated by the user as indicated in the designated/marked pre-recorded videos. Based on this learning and understanding of the false alarm activation in the designated/marked pre-recorded videos, a false alarm may be determined in a real-time video. Further, the camera, the server or the user terminal may be trained by employing these techniques for learning and understanding of the false alarm activation in the designated/marked pre-recorded videos to determine the false alarm in the real-time video. As discussed above, the artificial intelligence technique, machine learning technique or deep learning technique may receive the designated/marked pre-recorded videos as an input dataset samples. Then, these input dataset samples may be classified under one or more categories based on activities identified in the input dataset samples by the artificial intelligence technique, machine learning technique or deep learning technique. Also, the artificial intelligence technique, machine learning technique or deep learning technique may then use such categorized input dataset samples to train a system for determining a false alarm. Based on the trained system, when a new video is input to the system, the new video is analyzed to detect a false alarm.

FIG. 1 depicts a system architecture 100 for determining a false alarm based on an analysis of a false alarm activation in one or more pre-recorded videos, according to an exemplary embodiment of the invention. As depicted in FIG. 1, a premises 102, a camera 104 installed in the premises 102, an alarm unit 106 installed in the premises 102, a user 108, a server 112 connected to the camera 104 through a network 110A and a user terminal 114 connected to the camera 104 through a network 110B.

The user 108 may touch, press, pull or trigger the alarm unit 106. Such an incident may be captured as a real-time video by the camera 104 installed in the premises 102 where the user 108 is touching, pulling or triggering the alarm unit 106. When the camera 104 receives the real-time video, the camera may analyze the real-time video to determine whether the user 108 has touched, pressed, pulled or triggered the alarm unit 106 falsely, accidentally or maliciously. And, if the user 108 has touched, pressed, pulled or triggered the alarm unit 106 falsely, accidentally or maliciously, then, such an alarm may be a false alarm. The camera 104 may use the artificial intelligence technique, machine learning technique or deep learning technique as discussed above to predict or determine a false alarm in the real-time video. In specific, the camera 104 may determine the false alarm in the real-time video based on the analysis of a false alarm activation in the one or more pre-recorded videos by using learning techniques as explained above. Also, the camera 104 may use the artificial intelligence technique, machine learning technique or deep learning technique as discussed above to determine the false alarm in the real-time video by comparing the real-time video with the one or more pre-recorded videos.

In an alternative embodiment, the camera 104 may transmit the real-time video to the server 112 through the network 110A. Then, the server 112 may receive and analyze the real-time video to predict or determine a false alarm in the real-time video. Further, the server 112 may determine the false alarm in the real-time video based on the analysis of the false alarm activation in the one or more pre-recorded videos using learning techniques as explained above. Also, the server 112 may use the artificial intelligence technique, machine learning technique or deep learning technique as discussed above to determine the false alarm in the real-time video by comparing the real-time video with the one or more pre-recorded videos.

In another different embodiment, the camera 104 may transmit the real-time video to the user terminal 114 through a network 110B. Then, the user terminal 114 may receive and analyze the real-time video to predict or determine a false alarm in the real-time video. Further, the user terminal 114 may determine the false alarm in the real-time video based on the analysis of the false alarm activation in the one or more pre-recorded videos using the learning techniques as explained above. Further, the user terminal 114 may also receive the real-time video from the server 112 through the network 110C. Also, the user terminal 114 may use the artificial intelligence technique, machine learning technique or deep learning technique as discussed above to determine the false alarm in the real-time video by comparing the real-time video with the one or more pre-recorded videos.

In particular, the camera 104, the server 112 or the user terminal 114 may identify an activity/action of a person or a movable object in the real-time video present near the alarm unit 106. Then, the camera 104, the server 112 or the user terminal 114 may try to find a similarity between the identified activity in the real-time video and the identified activity in the one or more pre-recorded videos. In other words, the analysis of the identified activity in the one or more pre-recorded videos may be applied to the real-time video in order to determine whether a false alarm has been activated by the user 108 in the real-time video.

When the camera 104, the server 112 or the user terminal 114 determines that the real-time video indicates a false alarm, then the camera 104, the server 112 or the user terminal 114 may generate an alert. Such an alert may be a text message, an audio message, a video message or any such message well known in the art. Also, the alert may be provided to a facility of the premises 102 to inform the facility about the false alarm. This avoids panic and disturbance among the people present in the facility. As used herein, the facility may be a particular control room where the user terminal 114 may be present. Alternatively, on receiving the alert regarding possibility of a false alarm, the facility may stop the occurrence of an alarm activation by asking the user 108 to clear the premises 102 who activated the false alarm in past.

Moreover, when the camera 104, the server 112 or the user terminal 114 determines that the real-time video does not indicate a false alarm, then the camera 104, the server 112 or the user terminal 114 may determine that the alarm is an actual alarm and may provide an indication to the facility to warn the people in the facility regarding the actual alarm. This would timely inform the people of the facility to take appropriate action. In an embodiment of the invention, in case of a fire alarm activation, the people may vacate the premises 102 in time.

Figure 2:
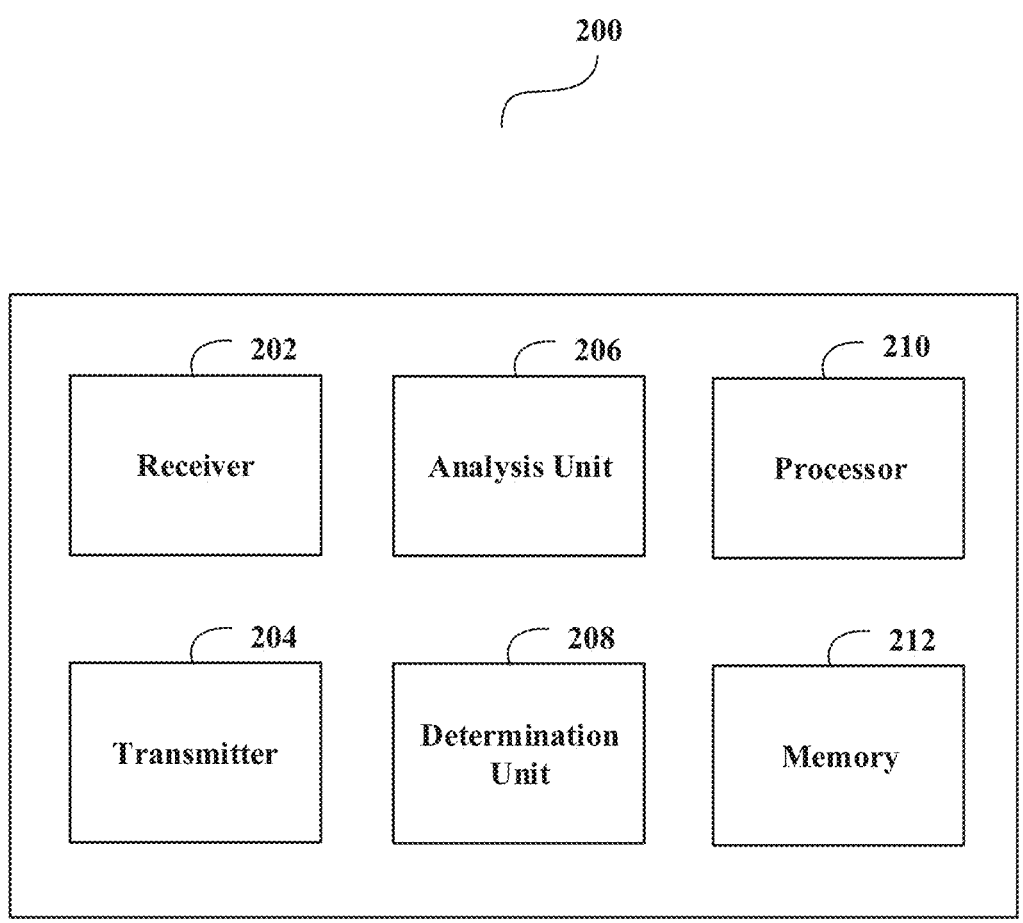
FIG. 2 depicts block diagram of different components of a system according to an exemplary embodiment of the invention.

FIG. 2 depicts a block diagram of different components of a system 200 according to an exemplary embodiment of the invention. The system 200 may comprise of, but is not limited to, a receiver 202, a transmitter 204, an analysis unit 206, a determination unit 208, a processor 210 and a memory 212. The system 200 may be a camera 104, a server 112 or a user terminal 114 as explained above. The receiver 202 may be adapted to receive one or more pre-recorded videos, the one or more pre-recorded videos indicating a false alarm activation. The analysis unit 206 may be adapted to receive the one or more pre-recorded videos from the receiver 202 and may also be adapted to analyze the false alarm activation in the one or more pre-recorded videos as discussed above. The receiver 202 may further be adapted to receive a real-time video captured by the camera 104. The determination unit 208 may be adapted to receive the real-time video from the receiver 202 and may also be adapted to determine a false alarm in the real-time video based on the analysis of the false alarm activation in the one or more pre-recorded videos. The determination unit 208 may also be adapted to generate an alert when the false alarm is determined in the real-time video and may be adapted to provide an indication to a facility when the false alarm is not determined in the real-time video. Further, the transmitter 204 may be adapted to transmit the one or more pre-recorded videos and/or the real-time video to the server 112 or the user terminal 114. Moreover, the receiver 202, the transmitter 204, the analysis unit 206, the determination unit 208 and/or the memory 212 may be communicably coupled with the processor 210.

Figure 3:
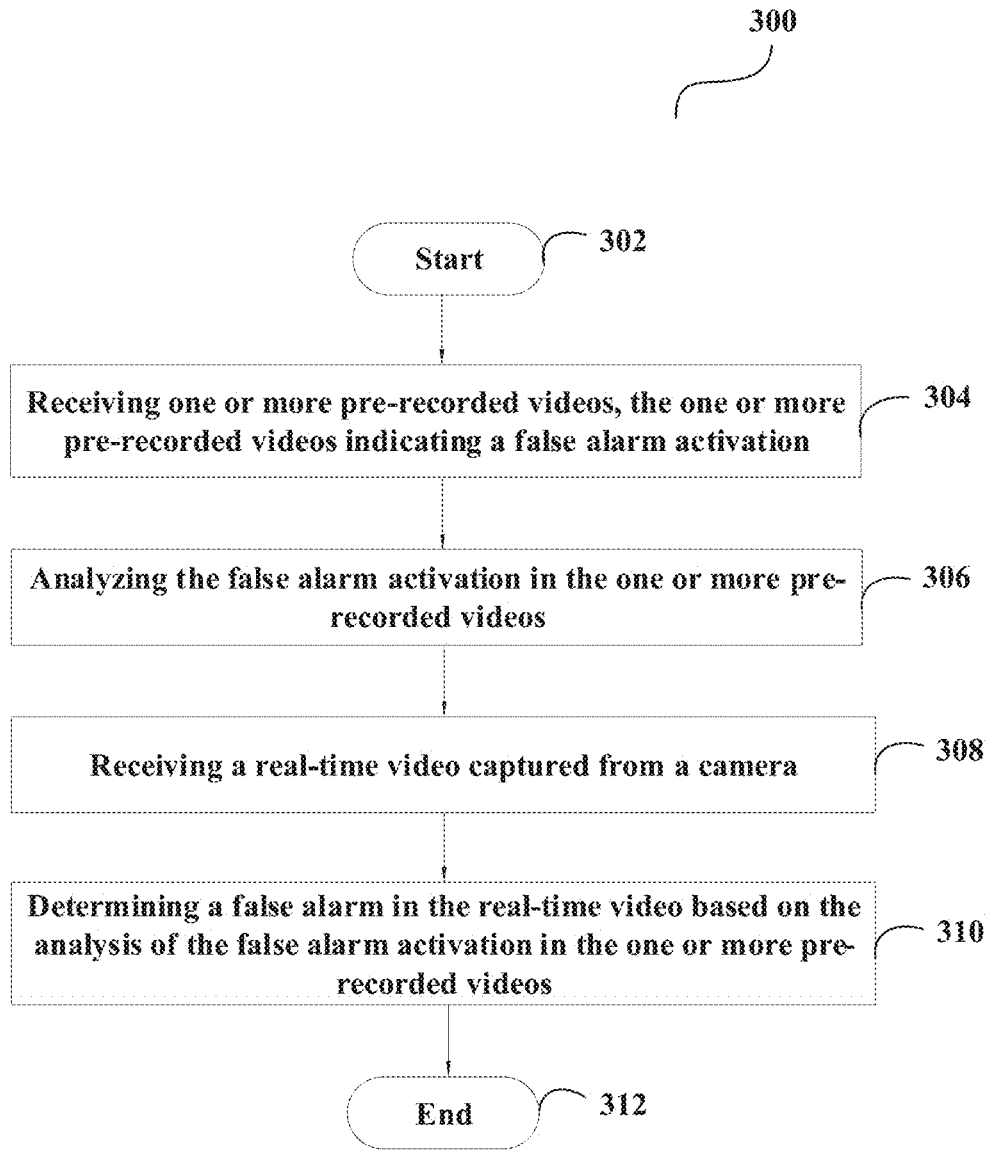
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method being performed for determining a false alarm based on an analysis of a false alarm activation in one or more pre-recorded videos. The method flowchart 300 starts at step 302.

At step 304, the camera 104, the server 112 or the user terminal 114 may receive one or more pre-recorded videos, the one or more pre-recorded videos indicating a false alarm activation. The one or more pre-recorded videos may be captured by one or more cameras.

At step 306, the camera 104, the server 112 or the user terminal 114 may analyze each of the one or more pre-recorded videos indicating the false alarm activation. Such an analysis of each of the one or more pre-recorded videos may be performed to learn and understand how the false alarm is activated by the user.

At step 308, the camera 104, the server 112 or the user terminal 114 may receive a real-time video captured from a camera 104.

At step 310, the camera 104, the server 112 or the user terminal 114 may determine a false alarm in the real-time video based on the analysis of the false alarm activation in the one or more pre-recorded videos, as discussed above. The method flowchart may end at 312.

The present invention is applicable to various fields/industries such as, but is not limited to, hospitality industry, hostels, educational institutes, homes, offices, and any such field/industry where the alarm unit can be used and is obvious to a person skilled in the art.

The present invention provides the following technical advantages over the existing solutions a) automatically determines a false alarm in a real-time video based on analysis of the pre-recorded videos indicating a false alarm activation, b) avoids disturbance or panic amongst the people caused by the false alarm, c) eliminates the need to leave or vacate a premises after an alarm is falsely or maliciously activated by a person, and d) increases trust among people for relying on an alarm unit, e) timely informs people about a false alarm by transmitting alert, and f) timely informs people about an actual alarm by providing indication.

The embodiments of the invention and the tables discussed herein are exemplary and various modification and alterations to a person skilled in the art are within the scope of the invention.

In one embodiment of the invention, the invention can be operated using the one or more computer readable devices. The one or more computer readable devices can be associated with a system 200. A computer readable medium comprises one or more processors and a memory coupled to the one or more processors, the memory storing instructions are executed by the one or more processors, the one or more processors configured to receive one or more pre-recorded videos, the one or more pre-recorded videos indicate a false alarm activation. The memory storing instructions are executed by the one or more processors, the one or more processors configured to analyze the false alarm activation in the one or more pre-recorded videos and receive a real-time video captured from a camera 104. The memory storing instructions are executed by the one or more processors, the one or more processors also configured to determine a false alarm in the real-time video based on the analysis of the false alarm activation in the one or more pre-recorded videos.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein.

Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Furthermore, the terms "user," "subscriber," "customer," "consumer," "agent," and the like are employed interchangeably throughout the subject specification, unless context warrants particular distinction(s) among the terms. Such terms can refer to human entities or automated components supported through artificial intelligence (e.g., a capacity to make inference based on complex mathematical formalisms) which can provide simulated vision, sound recognition and so forth.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving one or more pre-recorded videos, the one or more pre-recorded videos indicating a false alarm activation;
analyzing the false alarm activation in the one or more pre-recorded videos;
receiving a real-time video captured from a camera; and
determining a false alarm in the real-time video based on the analysis of the false alarm activation in the one or more pre-recorded videos;
wherein the false alarm activation in the one or more pre-recorded videos or the false alarm in the real-time video depicts a false activation of an alarm by a user;
wherein the alarm comprises a fire alarm, a smoke alarm, or a heat alarm.

2. The method of claim 1, wherein the false alarm in the real-time video is determined by comparing the real-time video with the one or more pre-recorded videos.

3. The method of claim 1, wherein the one or more pre-recorded videos indicating false alarm activation are filtered and designated by a server.

4. The method of claim 3, wherein the filtering and designation of the pre-recorded videos is enabled at a user terminal.

5. The method of claim 1, further comprising, generating an alert when the false alarm is determined in the real-time video.

6. The method of claim 1, further comprising, providing an indication to a facility when the false alarm is not determined in the real-time video.

7. The method of claim 1, wherein the alarm is activated when the user touches, pulls, presses or triggers an alarm unit.

8. The method of claim 7, wherein the camera and the alarm unit are installed proximate to each other.

9. A system comprising:
a receiver adapted to receive one or more pre-recorded videos, the one or more pre-recorded videos indicating a false alarm activation;
an analysis unit adapted to analyze the false alarm activation in the one or more pre-recorded videos;
the receiver adapted to receive a real-time video captured from a camera; and
a determination unit adapted to determine a false alarm in the real-time video based on the analysis of the false alarm activation in the one or more pre-recorded videos;
wherein the false alarm activation in the one or more pre-recorded videos or the false alarm in the real-time video depicts a false activation of an alarm by a user;
wherein the alarm comprises a fire alarm, a smoke alarm, or a heat alarm.

10. The system of claim 9, wherein the false alarm in the real-time video is determined by comparing the real-time video with the one or more pre-recorded videos.

11. The system of claim 9, wherein the one or more pre-recorded videos indicating false alarm activation are filtered and designated by a server.

12. The system of claim 9, wherein, the determination unit is further adapted to generate an alert when the false alarm is determined in the real-time video.

13. The system of claim 9, wherein, the determination unit is further adapted to provide an indication to a facility when the false alarm is not determined in the real-time video.

14. The system of claim 9, wherein the alarm is activated when the user touches, pulls, presses or triggers an alarm unit.

15. The system of claim 14, wherein the camera and the alarm unit are installed proximate to each other.

16. A computer readable medium comprising one or more processors and a memory coupled to the one or more processors, the memory storing instructions which are executed by the one or more processors, the one or more processors configured to:
receive one or more pre-recorded videos, the one or more pre-recorded videos indicating a false alarm activation;
analyze the false alarm activation in the one or more pre-recorded videos;
receive a real-time video captured from a camera; and
determine a false alarm in the real-time video based on the analysis of the false alarm activation in the pre-recorded one or more videos;
wherein the false alarm activation in the one or more pre-recorded videos or the false alarm in the real-time video depicts a false activation of an alarm by a user;
wherein the alarm comprises a fire alarm, a smoke alarm, or a heat alarm.

* * * * *